United States Patent [19]

Haerle

[11] Patent Number: 4,966,811
[45] Date of Patent: Oct. 30, 1990

[54] INNER SUPPORT MATRIX FOR MOULDED BODIES

[75] Inventor: Hans A. Haerle, Bopfingen, Fed. Rep. of Germany

[73] Assignee: Schaebische Huettenwerke GmbH, Aalen-Wasseralfingen, Fed. Rep. of Germany

[21] Appl. No.: 397,557

[22] Filed: Aug. 23, 1989

[30] Foreign Application Priority Data

Aug. 24, 1988 [DE] Fed. Rep. of Germany ....... 3828706

[51] Int. Cl.$^5$ .............................................. D02G 3/00
[52] U.S. Cl. ..................................... 428/375; 428/378; 428/379; 428/396; 428/457; 419/2; 419/5; 419/8; 419/27; 75/229
[58] Field of Search ................ 428/457, 549, 375, 378, 428/396, 379; 419/2, 27, 5, 8; 75/229

[56] References Cited

U.S. PATENT DOCUMENTS

| | | | |
|---|---|---|---|
| 3,449,093 | 6/1969 | Baxt et al. | 428/551 |
| 3,449,094 | 6/1969 | Baxt et al. | 428/551 |
| 3,889,348 | 6/1975 | Lemelson | 419/8 |
| 4,666,787 | 5/1987 | Bickle et al. | 428/551 |
| 4,767,677 | 8/1988 | Kuwayama | 428/551 |

*Primary Examiner*—Stephen J. Lechert, Jr.
*Assistant Examiner*—Leon Nigohosian, Jr.
*Attorney, Agent, or Firm*—Jenner & Block

[57] ABSTRACT

A moulded body having an inner support matrix is enveloped at least partially with a plastic envelope making up the mould. The support matrix is formed at least partially from metal wire pieces and/or metal chips, which are compression moulded and sintered.

18 Claims, 1 Drawing Sheet

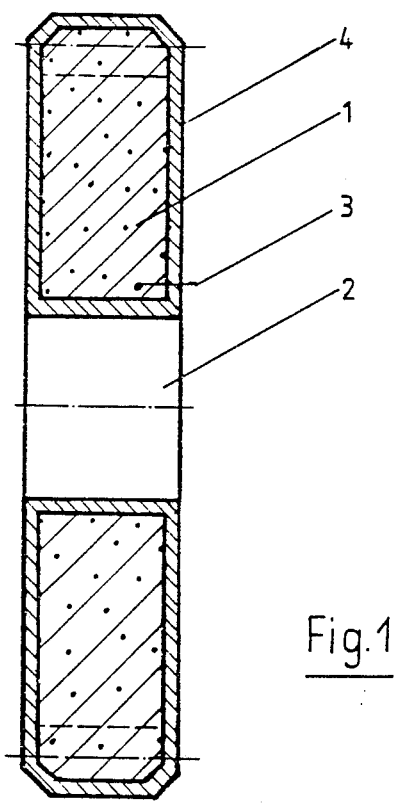
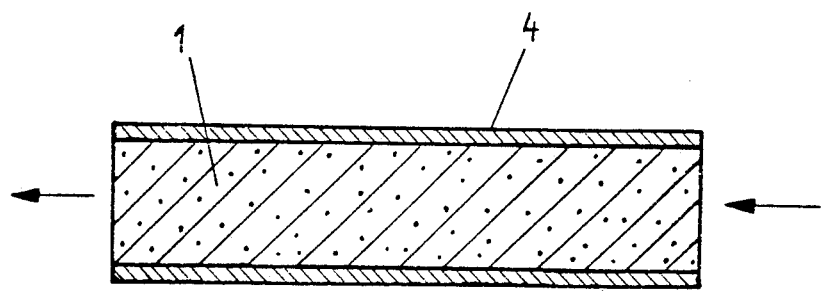

INNER SUPPORT MATRIX FOR MOULDED BODIES

TECHNICAL FIELD

The invention relates to moulded body structures having an inner support matrix which is surrounded, at least partially, with a plastic envelope.

BACKGROUND OF THE INVENTION

Moulded bodies of this type are employed in various areas of technology. On their inside, they are provided with a core made from a support matrix for moulding and stabilization. The support matrix can be composed of a plastic which is strengthened for example with glass balls, glass fibers or the like. This is a so-called soft matrix, providing a relatively light structural member, but does not possess high strength.

Support matrices which are made from metal are also known, and yield high stability and security from breakage but they also result in high weight.

SUMMARY OF THE INVENTION

The purpose of the present invention is to produce a moulded body of the type mentioned above, which is light in weight as well as being strong that can be used for various purposes.

According to the invention the support matrix includes, at least partially, metal wire pieces and/or metal chips, which are compression moulded, and sintered.

The production of sintered pieces from metal powder is basically known. The powder is compression moulded in a cold or warm state and sintered afterwards. By this is meant heating in a reducing atmosphere to temperatures which are about ⅔ to 4/5 of the melting point of the metal powder used. This results in a caking of the metal areas, and provides for strengthening of the powder mixture.

When using metal chips or metal wire pieces as base material in a support matrix, a process which was previously unknown, very coarse-pored material is produced, which is very light in weight, but nevertheless very stable. When such a sinter piece is used in the support matrix for a moulded body, and the moulded body is surrounded, at least partially, with plastic, a moulded body light in weight and of substantial strength is obtained, which can be applied advantageously in many areas of technology and can fulfill a variety of purposes economically.

Areas of use for this structure can include, for example, eccentric rotary vane pumps, water pumps, gear wheels, toothed belt wheels, and various types of thrust pieces.

Advantageously, not only the base material of the support matrix will be surrounded with plastic having an appropriate strength, which can be variable, of course, and will be selected in dependence of the field of application, but also the pores of the base material are saturated at least partially with the plastic. This measure contributes to a further increase of the stability and loadability, but does not lead to higher weight. Furthermore, the moulded body can be made fluid- and gastight thereby extending its application areas.

In this way, for example, a journal-bearing bushing or another friction bearing member can be produced as a moulded body according to the invention.

Instead of completely enveloping the moulded body with an outer plastic envelope, it can, if necessary, be enveloped only partially with plastic, or be provided with a plastic envelope in certain areas. In this way, while providing lightweight and a high strength, a structure with gas and/or liquid permeability is achieved. The moulded body according to the invention can, for example, also be used for filtering means or as a catalyst. In the latter case, the metal powder, metal wire and/or metal chips will consist of a catalytically working material, or which are layered therewith. Thus, the moulded body according to the invention can also be used for example as a catalyst and/or filter for cleaning exhaust gas of radiator systems.

If need be, ceramic pieces can be mixed with the metal pieces, whereby the area of use of the moulded body according to the invention is increased further, as, for example, regarding its catalytic effect and higher temperature durability.

A further advantage of the moulded body according to the invention provides for very true measurements. With the support core or support matrix formed of sintered material according to the invention, the shrinking behavior when applying the plastic can be substantially reduced. Furthermore, the sintered material binds very well with the plastic, so that a rigid compound results.

The support matrix of sintered metal can be made entirely from metal wire pieces and/or metal chips, or in a mixture of such materials with metal powder, especially coarse metal powder, if desired, by adding ceramics and/or other materials.

By selecting the appropriate mixture, a very wide range of lightness in weight, pore size, and stability or loading and strength from breakage can be achieved.

The size of the metal wire pieces and/or metal chips or their diameters, thickness and lengths are selected according to the area of use. For example, diameters or thickness of 0.1 to 1 mm and lengths of 0.5 to 4 mm are particularly desirable.

BRIEF DESCRIPTION OF THE DRAWINGS

FIG. 1 illustrates the invention as a gear wheel; and
FIG. 2 illustrates the invention as a filter or a catalyst body.

DETAILED DESCRIPTION OF THE INVENTION

As shown in FIG. 1, a gear wheel is formed from a support matrix and includes a central bore 2 for mounting the gear wheel on a shaft.

The support matrix 1 is formed from compression moulded metal chips, which are sintered afterwards in the usual way. The support matrix 1 manufactured in this way is introduced into a plastic jet mould, after which a plastic, such as epoxyde resin or polytetraflouroethylene is injected in the usual way. The support matrix 1 is provided on all sides with an envelope 4 of plastic whereby, in the example shown, the plastic envelope 4 is relatively thin. Naturally, the thickness of the envelope can be selected as desired.

A filter or catalyst body is shown in FIG. 2. As depicted, only the surrounding wall of the cylinder shown is provided with a plastic envelope 4. The two end openings are provided for gas or piston passage (according to area of use), whereby a medium to be filtered can flow through the filter body in longitudinal direction. In this case, the pores of the support matrix will only be filled partially with plastic or, in dependence on the medium to be filtered, possibly entirely without plastic saturation. Different porosities across the length of the filter body can also be used where necessary.

If the filter body is to be used additionally or instead as catalyst, catalytical materials will be used for the compression moulded metal chips or wire pieces or coarse metal grains, or the metal parts can be layered therewith.

I claim:

1. A molded body comprising: a non-planar inner support matrix body, a plastic envelope surrounding at least partially said support matrix wherein said support matrix body is formed at least partially from metal wire elements.

2. The moulded body according to claim 1, wherein pores of the support matrix are saturated at least partially with a plastic material.

3. The moulded body according to claim 2, wherein the support matrix is only saturated segmentally with said plastic material.

4. The moulded body according to claim 2, wherein said plastic material is epoxy resin.

5. The moulded body according to claim 2, wherein said plastic material is polytetraflouroethylene.

6. The moulded body according claim 1, wherein said support matrix includes a mixture of coarse metal powder and metal elements, which are compression moulded and sintered.

7. The moulded body according to claim 6, wherein said mixture includes ceramic materials.

8. The moulded body according to claim 6, wherein said metal elements include a catalytic material.

9. The moulded body according to claim 6, wherein said metal elements have diameters of 0.1 to 5 mm and lengths of 0.5 to 10 mm.

10. The moulded body according to claim 1, wherein said metal elements have diameters or thickness of 0.1 to 1 mm and lengths of 0.5 to 4 mm.

11. A process for the production of a moulded body having an inner support matrix, which is surrounded at least partially with a plastic envelope, comprising the steps of: forming the support matrix of at least partially from metal elements, which are compression moulded and sintered and enveloping the support matrix at least partially with a plastic.

12. The process according to claim 11, wherein the pores of the support matrix are saturated at least partially with a plastic material.

13. The process according to claim 11, wherein said forming step includes forming said support matrix from a mixture of coarse metal powder and said metal elements are compression moulded together, and sintered.

14. A moulded body comprising: an inner support matrix formed at least partially of compression moulded and sintered metal wire elements and at least partially surrounded by a plastic envelope.

15. The moulded body of claim 14 wherein said metal wire elements are porous and wherein the pores of said metal wire elements are saturated at least partially with a plastic material.

16. The moulded body of claim 14 wherein said plastic envelope completely surrounds said support matrix.

17. The moulded body of claim 14 wherein said support matrix is of a generally ring shaped configuration having a central bore and wherein said plastic envelope completely surrounds said support matrix.

18. The moulded body of claim 14 wherein said support matrix is configured as a cylinder and wherein said plastic envelope surrounds the surface of said cylinder and at least portions of the ends of said cylinder are not covered by said plastic envelope.

* * * * *